United States Patent
Beyer

(10) Patent No.: US 7,075,083 B2
(45) Date of Patent: Jul. 11, 2006

(54) METHOD FOR EXAMINING THE STRUCTURE OF THROUGH-HOLES OF A COMPONENT

(75) Inventor: Roman Beyer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 176 days.

(21) Appl. No.: 10/500,747

(22) PCT Filed: Sep. 12, 2003

(86) PCT No.: PCT/EP03/10172

§ 371 (c)(1),
(2), (4) Date: Jun. 30, 2004

(87) PCT Pub. No.: WO2004/046700

PCT Pub. Date: Jun. 3, 2004

(65) Prior Publication Data

US 2005/0173636 A1    Aug. 11, 2005

(30) Foreign Application Priority Data

Nov. 4, 2002 (EP) .................................. 02024601

(51) Int. Cl.
*G01N 21/35* (2006.01)

(52) U.S. Cl. .................................. 250/341.1; 250/340
(58) Field of Classification Search ................ 250/330, 250/340, 341.1, 341.6; 219/121.7; 374/153
See application file for complete search history.

(56) References Cited

U.S. PATENT DOCUMENTS

| | | | |
|---|---|---|---|
| 3,795,133 A * | 3/1974 | Fergason et al. ................ 347/7 |
| 4,644,162 A | 2/1987 | Bantel et al. |
| 4,702,808 A * | 10/1987 | Lemelson .............. 204/157.41 |
| 4,792,698 A * | 12/1988 | Pryor ..................... 250/559.23 |
| 4,873,414 A | 10/1989 | Ma et al. |
| 5,054,087 A | 10/1991 | Carbon et al. |
| 5,096,379 A * | 3/1992 | Stroud et al. ............. 416/97 R |
| 5,111,046 A | 5/1992 | Bantel |
| 5,125,035 A * | 6/1992 | McCarthy et al. .......... 382/141 |
| 5,222,617 A * | 6/1993 | Gregory et al. ........ 219/121.71 |
| 5,365,033 A * | 11/1994 | Williams ............... 219/121.71 |
| 5,426,506 A * | 6/1995 | Ellingson et al. ........... 356/369 |
| 5,582,485 A * | 12/1996 | Lesniak ......................... 374/5 |
| 6,285,449 B1 * | 9/2001 | Ellingson et al. ......... 356/237.1 |
| 6,339,208 B1 * | 1/2002 | Rockstroh et al. ..... 219/121.71 |
| 6,365,871 B1 * | 4/2002 | Knowles et al. ......... 219/121.7 |
| 6,455,850 B1 * | 9/2002 | Coates et al. ............ 250/338.1 |

FOREIGN PATENT DOCUMENTS

| | | |
|---|---|---|
| DE | 35 33 186 A1 | 3/1986 |
| DE | 197 20 461 A1 | 2/1998 |
| EP | 0 854 005 A2 | 7/1998 |
| JP | 03151501 A | 6/1991 |

* cited by examiner

*Primary Examiner*—David Porta
*Assistant Examiner*—Faye Polyzos

(57) ABSTRACT

Methods for examining through holes of a component according to prior art generally use hot gases for the thermographic detection of blockages. The inventive method for examining the structure of through holes of a component considerably simplifies said techniques, using a medium which has at least one absorption edge in the region of the wavelength of the camera and thus appears opaque in the camera image.

8 Claims, 1 Drawing Sheet

METHOD FOR EXAMINING THE STRUCTURE OF THROUGH-HOLES OF A COMPONENT

CROSS REFERENCE TO RELATED APPLICATION

This application is the US National Stage of International Application No. PCT/EP2003/010172, filed Sep. 12, 2003 and claims the benefit thereof. The International Application claims the benefits of European Patent application No. 02024601.3 EP filed Nov. 4, 2002, both of the applications are incorporated by reference herein in their entirety.

FIELD OF INVENTION

The invention relates to a method of checking the structure of through-holes of a component according to the precharacterizing clause of claim 1.

BACKGROUND OF INVENTION

Through-holes of components, for example laser-drilled holes, in particular cooling-air holes of gas turbine blades, often have complex geometries that differ from a cylindrical form. The diameter of the hole that is effective for flow, the location of the hole in the wall of the component, the position and the location and the offset of the diffusors (outflow region widened in cross section) of these holes vary on account of tolerances of the casting, laser or erosion process for example, or on account of the respective production conditions.

The effectiveness of the cooling-air bores on the airfoil profile of the turbine blade results from the complex interrelationship between these stated variables. Up to the present time, they cannot be determined or measured in an automated manner or without great technical expenditure.

With the conventional methods, the continuity of bores is checked by the detection of the heated component surface, i.e. if the hole is blocked, no heating of the material at the bore hole will occur. The disadvantage of this method is that a small opening (partial closure of the bore) also allows air to pass through and heat up the material. In a thermographic image it is scarcely possible to distinguish between partially closed bores and open bores.

Both DE 35 33 186 A1 and DE 197 20 461 A1 show thermographic methods in which a heated gas is forced through the cooling-air bores. The supply of warm air entails considerable expenditure on apparatus. The conventional thermographic method records the temperature distribution on the component surface which is heated by the warm air. However, conclusions concerning the form of the bore cannot be drawn from the information which can be obtained.

SUMMARY OF INVENTION

It is therefore the object of the invention to overcome this problem.

The object is achieved by a method of checking the structure of through-holes of a component according to claim 1.

Further advantageous refinements of the method are listed in the subclaims.

A visual representation of the flow of gas flares emerging from the through-holes with the aid of the camera images produced and image analysis provides a wealth of information on the formation and location of the through-holes and permits both process control and design verification.

DETAILED DESCRIPTION OF INVENTION

Figure 1:
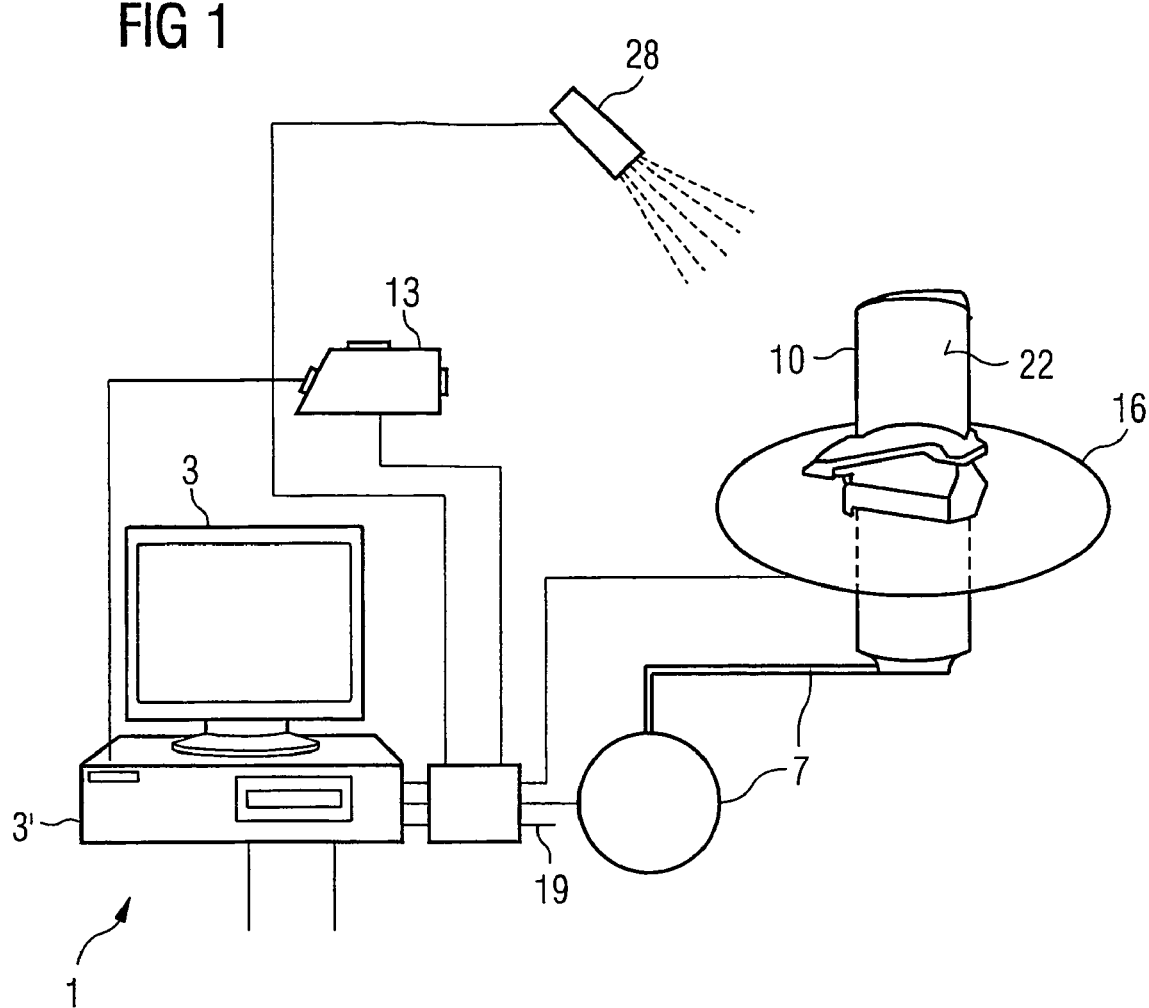
FIG. 1 shows a device 1 with which the method according to the invention can be carried out.

The device 1 according to FIG. 1 comprises, inter alia, a computer 3 with a screen, to which a camera 13, for example an infrared camera 13, possibly a source of illumination 28 and further control elements 19 are connected.

Also connected to the computer 3 for example is a supply of medium 7, which controls the flow of a medium (gas, fluid) into the interior of the component 10.

This medium then emerges again from through-holes 25 in the surface 22 (FIG. 2) of the component 10, for example at the diffusor that is present.

The component 10, or at least a through-hole 25, is irradiated by the source of irradiation 28. The source of irradiation 28 has a specific wavelength range. The source of irradiation 28 may also be ambient light. The rays of the source of irradiation 28 impinge on the surface 22 of the component 10, where they are reflected and absorbed. The reflected rays are recorded by the camera 13.

The medium has in the region of the wavelength(s) used by the source of irradiation 28 at least an absorption line, edge or strip.

Since the medium absorbs the rays of the source of irradiation in the region of the through-hole 25, the rays of the source of irradiation 28 which impinge in the region of the through-hole 25 are consequently at least attenuated, and do not reach the camera 13, or only in an attenuated form.

The wavelength or wavelength range of the source of irradiation (28) can consequently be detected by the camera (13).

The surface 22 of the component 10 is for example recorded by an infrared camera 13.

In order to measure the entire surface 22, the component 10 is for example arranged on an adjusting unit 16, which is movable, for example rotatable. Similarly, the component 10 may be fixedly arranged and the infrared camera 13 is moved in relation to the surface 22 of the component 10. The component 10 and the adjusting unit 16 may also be movable in all three spatial directions.

According to the invention, the medium, for example a gas, absorbs in the range of the wavelength(s) of the source of irradiation 28 that are used.

The medium is, for example, carbon dioxide ($CO_2$), which has an absorption band in the range of the wavelength of 3–5 ($\mu m$). The source of irradiation 28 possibly has at least a wavelength in the range of 3–5 ($\mu m$). The camera can detect at least this one wavelength of the source of irradiation 28.

Consequently, it is possible to distinguish this gas from the surroundings in the camera image as an opaque matter. The gas $CO_2$ is particularly well suited, since it has similar fluid-dynamic properties to air, which is used for example as the cooling medium.

The evaluation of the camera image at individual through-holes 25 leads to the concentration distribution or propagation direction of the medium flowing out from the through-hole 25. Given sequential expulsion of CO2 clouds and integration of the concentration values, the determination of the amount, and consequently of the through-flow capacity, of the respective bore hole is possible from the concentration distribution. With this information, the production parameters, for example of the laser and erosion processes, can be optimally adapted for individual through-holes 22.

The observation by means of stereo perspective or the variation of the observation angle of the camera 13 and component 10 makes it possible to determine the three-dimensional propagation of a flare of medium via the diffusor and the adjacent outer profile region. This results in possibilities, for example numerical models, for verifying the flow distribution at the through-hole 22 and diffusor.

After that, the analysis of a gas flare allows further statements to be made concerning the bore diameter and effects of the geometry of the hole on the outflow behavior—and also the angle of emergence, etc.

The flowing medium may have the same temperature as the component 10; therefore, by contrast with the previously known thermographic methods, it does not have to be heated up.

Similarly, however, it is possible to heat up the medium, if an absorption band in the wavelength range of the camera 13 that is used is achieved by the heating up.

Warm gas or fluid may also flow through the through-hole 25, in order to investigate the outflow behavior of warm gases. For example, gas with a temperature that is greater than room temperature also flows through a cooling-air bore of a turbine blade during operation.

Control elements 19 coordinate for example the movement of the camera 13, the source of irradiation and the component 10 and also the medium flow 7 in relation to one another.

Figure 2:
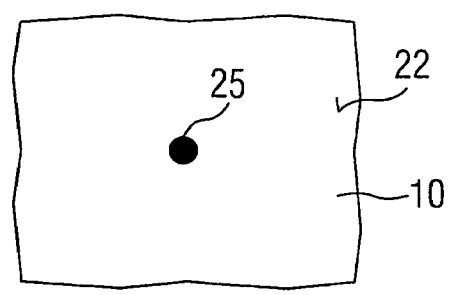
FIG. 2 shows a camera image taken with the method according to the invention.

FIG. 2 shows a camera image taken with the method according to the invention.

On the surface 22 of the component with the through-hole 25, the medium flowing out appears for example as black against the considerably lighter-appearing surface.

The outflow region of the gas after emergence from the through-hole 25 also appears for example as black against the surroundings.

The invention claimed is:

1. A method of examining the structure of through-holes of a turbine component, comprising:
    flowing a medium through the through-hole;
    irradiating the component by an irradiation source such that the medium has at least an absorption line at one or more wavelengths of the irradiation source; and
    recording the component by a camera while the medium is flowing through the through-holes and being irradiated.

2. The method as claimed in claim 1, wherein the component is a turbine blade with cooling holes as through-holes.

3. The method as claimed in claim 1, wherein gaseous carbon dioxide is used as the medium.

4. The method as claimed in claim 1, wherein the wavelength which can be detected by the camera includes the wavelength range of from 3–5 μm.

5. The method as claimed in claim 1, wherein the medium is chosen such that a camera image in the region of the medium appears opaque.

6. The method as claimed in claim 1, wherein an infrared camera is used as the camera.

7. The method as claimed in claim 1, wherein at least the wavelength or wavelength range of the source of irradiation can be detected by the camera.

8. The method as claimed in claim 1, wherein the medium has an absorption edge or an absorption strip at one or more wavelengths of the source of irradiation.

* * * * *